W. H. CARRIER.
METHOD OF AND APPARATUS FOR DRYING, CONDITIONING, AND REGULATING THE MOISTURE CONTENT OF HYGROSCOPIC MATERIALS.
APPLICATION FILED JUNE 3, 1918.

1,330,238.

Patented Feb. 10, 1920.
2 SHEETS—SHEET 1.

INVENTOR.
Willis H. Carrier.
By Wilhelm & Parker
ATTORNEYS.

W. H. CARRIER.
METHOD OF AND APPARATUS FOR DRYING, CONDITIONING, AND REGULATING THE MOISTURE CONTENT OF HYGROSCOPIC MATERIALS.
APPLICATION FILED JUNE 3, 1918.
1,330,238.
Patented Feb. 10, 1920.
2 SHEETS—SHEET 2.
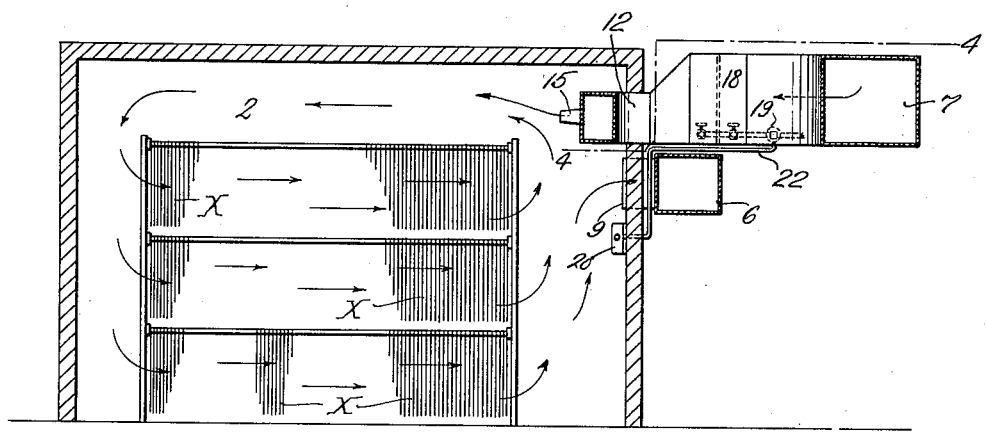
FIG. 3.
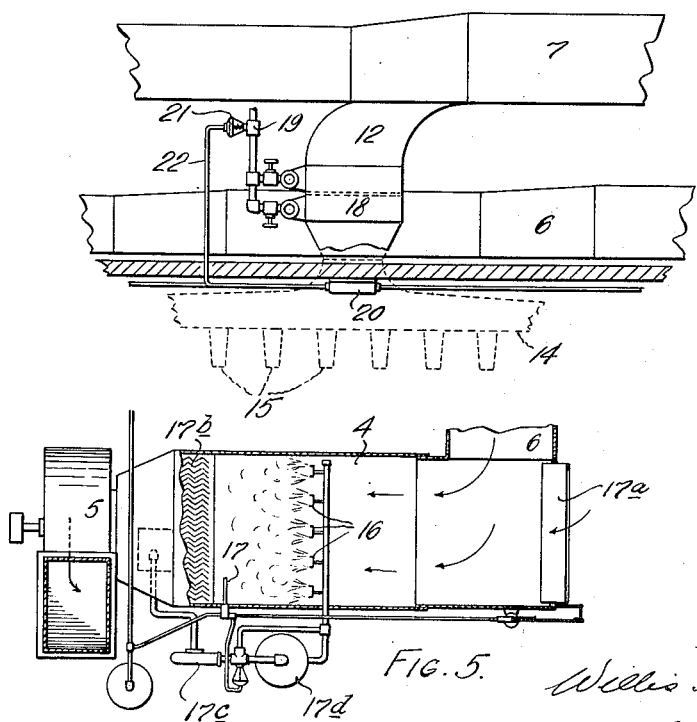
FIG. 4.
FIG. 5.
INVENTOR.
Willis H. Carrier,
by Wilhelm & Parker,
ATTORNEYS.

UNITED STATES PATENT OFFICE.

WILLIS H. CARRIER, OF BUFFALO, NEW YORK, ASSIGNOR TO BUFFALO FORGE CO., OF BUFFALO, NEW YORK.

METHOD OF AND APPARATUS FOR DRYING, CONDITIONING, AND REGULATING THE MOISTURE CONTENT OF HYGROSCOPIC MATERIALS.

1,330,238.  Specification of Letters Patent.  Patented Feb. 10, 1920.

Application filed June 3, 1918. Serial No. 237,859.

*To all whom it may concern:*

Be it known that I, WILLIS H. CARRIER, a citizen of the United States, residing at Buffalo, in the county of Erie and State of New York, have invented a new and useful Improvement in Methods of and Apparatus for Drying, Conditioning, and Regulating the Moisture Content of Hygroscopic Materials, of which the following is a specification.

This invention relates to a method of and apparatus for drying, conditioning and regulating the moisture content of hygroscopic materials in which air which has been saturated at a definite temperature and has a definite dew point is supplied to the room or rooms containing the material, and the temperature of such air supplied to each room is independently regulated by a heater under the control of a hygrostat for that room for controlling the relative humidity in said room. This invention is particularly applicable to the drying of hygroscopic materials, such as macaroni, lumber, etc., which require to be dried at high relative humidities, and to cases where it is desirable or necessary to maintain different relative humidities in different rooms which are supplied with humidified air from a single humidifier provided with a system of dew point control so as to produce saturated air at a definite temperature, so that the air supplied to all the rooms has the same moisture content or dew point. In drying macaroni, for instance, the best results are obtained by drying or treating the material in successive stages under different conditions of relative humidity by drying the material for a period of time in one room in an atmosphere having a high relative humidity and then continuing the drying in succession in rooms having successively lower humidities, fresh material being brought into each room to replace the material removed therefrom, so that the several stages of treatment can be carried on simultaneously in the several rooms. This prevents a too rapid drying of the outer surface of the material, prevents the product from checking or breaking and makes it possible to dry a large quantity of material in a relatively short time in a plant of moderate size. The invention is equally applicable to the treatment of other materials which it is desired to subject to treatment in successive stages under different humidity conditions.

In the preferred way of carrying out this method, air from a humidifier and having a predetermined definite moisture content or dew point is discharged under pressure and at a relatively high velocity into the several rooms containing the material in such a manner as to cause a circulation of the relatively larger volumes of air in the rooms and a thorough mixture of the introduced humidified air with the air in the rooms, and the temperature of the humidified air supplied to each room is independently regulated by a heater which is located in the air supply duct for that room, or is otherwise disposed so that the introduced humidified air is heated before it is mixed with the air in the room and comes into contact with the material. This heater is controlled by a hygrostat which is located so as to respond to changes in the relative humidity of the atmosphere in the room, the hygrostat and heater operating to raise the temperature of the humidified air to the extent necessary to maintain the desired relative humidity in the room for which the hygrostat is set, regardless of the increase in moisture content of the air in the room due to the moisture given off by the material. The relative humidity in each room is thus controlled independently of the conditions in the other rooms and the hygrostats can be set so as to give any desired humidity in each room and enable the simultaneous treatment under the same or different humidity conditions in the several rooms. Air is drawn from the rooms and returned to the humidifier and after it is brought to the predetermined dew point in the humidifier, the air is again discharged into the rooms, the air being thus circulated and used over and over, sufficient outside or fresh air being supplied to the humidifier to properly control the dew point or temperature of saturation of the air leaving the humidifier.

In the accompanying drawings:

Fig. 3 is a transverse sectional elevation thereof on line 3—3, Fig. 1.

Fig. 4 is a fragmentary sectional plan view thereof on line 4—4, Fig. 3.

Fig. 5 is an enlarged fragmentary plan view, partly in section, of the humidifier.

Figure 1:
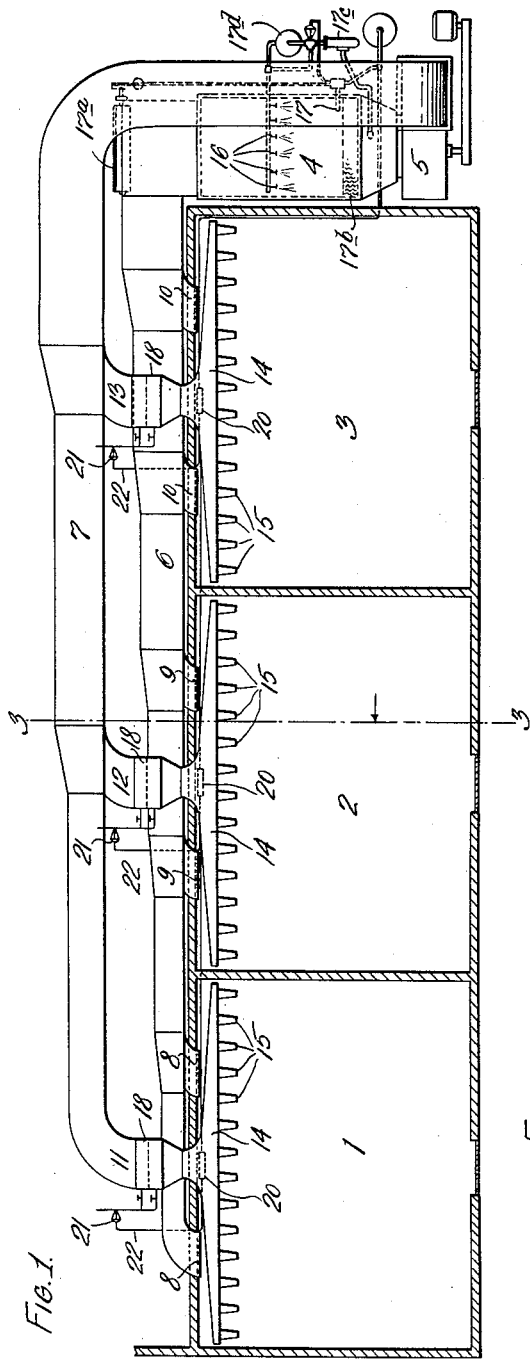
Figure 1 is a sectional plan view of an apparatus embodying the invention and suitable for practising the method claimed herein.
Figure 2:
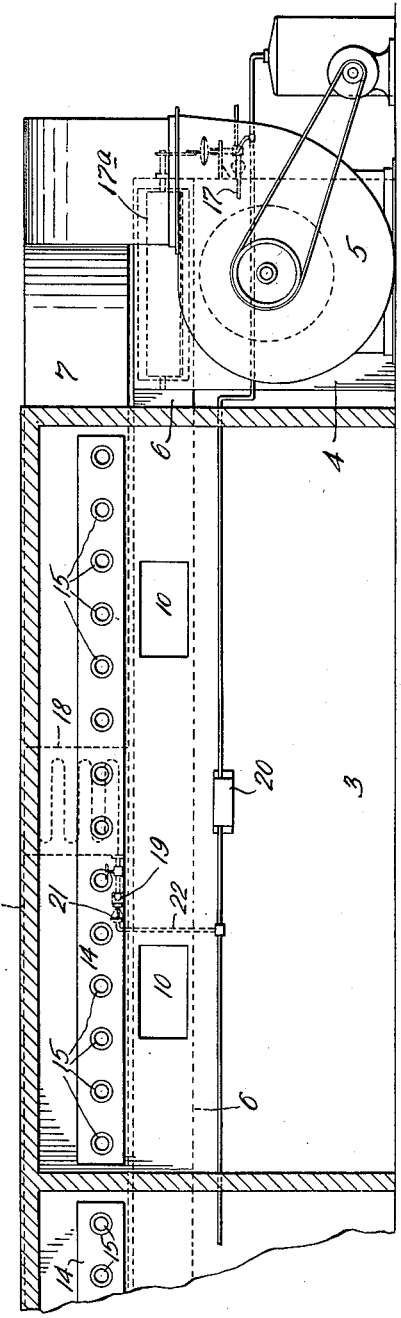
Fig. 2 is a fragmentary sectional elevation on an enlarged scale thereof.

1, 2 and 3 represent several rooms or chambers in which it is desired to maintain definite conditions of relative humidity for drying or conditioning material therein. 4 represents a humidifier or chamber in which air is humidified by means of a water spray to the point of saturation, thereby securing a definite dew point, and 5 indicates a fan for drawing the air from the rooms 1, 2 and 3 through an air return duct 6 and through the humidifier chamber 4 and returning the humidified air through a supply duct 7 to the rooms. The return duct 6 connects by branches or inlet openings 8, 9 and 10 with the rooms 1, 2 and 3 respectively, and the supply duct 7 connects with the several rooms by branch ducts 11, 12 and 13 respectively. The air is discharged into each room through a duct or header 14 provided with a series of discharge nozzles or outlets 15 which are preferably arranged along one side of the room near the ceiling so as to discharge the air horizontally near the ceiling in a direction toward the far side of the room. The air is discharged from these nozzles under pressure and at a sufficient velocity to induce an active circulation of the larger volume of air in the room and the thorough mixture of the humidified air discharged from the nozzles with the other air in the room. The return duct 6 is preferably arranged to draw the air from the room at, or adjacent to that side of the room where the supply or discharge nozzles 15 are located. The material X is preferably located in each room, as shown in Fig. 3, so as to leave connecting substantially unobstructed spaces in the room above the material, at the side of the material adjacent which the discharge nozzles are located and at the opposite far side of the material. The humidified air supplied to the room thus mixes and circulates with the larger volume of air in the room and the circulating mixed air is caused by induction to pass through the material in a direction substantially opposite to the direction in which the air is discharged into the room, as more fully explained in my application, Serial No. 157,674, filed March 27, 1917.

The condition of the air supplied from the humidifier 4 to the room is regulated so that when the air leaves the humidifier it has a predetermined definite moisture content or dew point. This can be accomplished by any suitable means. Preferably, the air in passing through the humidifying chamber is saturated by contact with a fine spray or mist of water discharged from nozzles 16 in the humidifying chamber and the temperature at which the air is saturated in the humidifying chamber is controlled by a thermostat 17 located so as to be affected by the temperature of the saturated air leaving the humidifier. This thermostat controls the temperature of saturation in the humidifying chamber 4 by regulating the temperature of the spray water and by controlling the position of dampers $17^a$ which regulate the admission of fresh or outside air to the humidifying chamber. The regulation of the temperature of the spray water for this purpose can be effected in the way explained in my Patent No. 854,270, granted May 21, 1907, or in any other suitable way. As explained in said patent, the spray water and the free water separated from the air by the eliminator $17^b$ collect in the bottom of the humidifier and are returned to the spray nozzles by a pump $17^c$, more or less of said circulating body of water passing through or around a heater $17^d$ under the control of the thermostat 17. The thermostat 17 governs the pressure of compressed air for operating motors or diaphragms which actuate the spray water controlling valve and the air dampers $17^a$ in a well known manner. The heater raises the temperature of the dew point and the fresh air admitted by the dampers $17^a$ lowers the dew point below the point it would normally be if all the air were recirculated. This provides a control in both direction which is desirable since there are times when with all the air recirculated there might not be sufficient heat to maintain the desired dew point on account of radiation, etc.

18 indicates a heater for each of the rooms 1, 2 and 3, for raising the temperature of the humidified air supplied to that room. This heater can be of any suitable construction and can be located in the branch air supply pipe for each room, or otherwise arranged so as to heat the humidified air supplied to the room before the humidified air mixes with the other air in the room. This insures an uniform humidity condition throughout the whole room and the uniform treatment of all of the material in the room. In the apparatus shown, one of the steam heaters 18 is located in each of the branch supply ducts 11, 12 and 13 and the supply of steam to this heater is regulated by a diaphragm valve 19 which is controlled by a hygrostat 20 suitably located in the room, or so as to respond to changes in the humidity of the atmosphere in the room. This hygrostat can operate the steam supply valve 19 through the instrumentality of a diaphragm or motor 21 actuated by compressed air supplied to the diaphragm or motor through a pipe 22 under the control of the hygrostat, or in any other suitable way.

The hygrostat 20 is set to maintain a desired relative humidity in the room in which it is located and if the moisture arising from the material in the room increases the humidity, the hygrostat will actuate the steam supply valve 19 to admit steam to the heater 18, thereby raising the temperature and consequently reducing the relative humidity of the humidified air supplied to the room through the discharge nozzles 15. The relative humidity of air supplied is thus varied sufficiently to maintain a substantially constant relative humidity in the room. Air having the same dew point is supplied from the humidifier through the branches 11, 12 and 13 to the several rooms 1, 2 and 3 and the hygrostats in the several rooms can be set to maintain any desired like or different relative humidities in the several rooms. Each hygrostat is affected by the humidity of the atmosphere in the room in which it is located and operates independently of the other hygrostats to control the humidity in that room. It is thus possible with humidified air of the same dew point supplied to all of the rooms to maintain relative humidities of say 90 per cent., 70 per cent. and 50 per cent. in the respective rooms 1, 2 and 3. As a consequence, the different batches of material in the different rooms can be dried or treated simultaneously under these different humidity conditions, and by shifting the material progressively from one room to the next, each batch of material can be dried or treated in successive stages under different desired humidity conditions. It is also possible with the apparatus described to change the setting of the hygrostat in one room from time to time so that the different stages of treating can be carried on in successive periods in the same room. In drying materials by this method, the humidified air supplied to the rooms ordinarily has a comparatively high temperature, such that the change in temperature produced by the heater for each room need be only sufficient to produce the required control of the relative humidity. Preferably, substantially the entire volume of air except that leaking from the rooms is recirculated and passes through the humidifier, only sufficient outside air being admitted to the humidifier to replace the air lost by leakage and to regulate the dew point as before explained.

I claim as my invention:—

1. The herein described method of drying hygroscopic materials, consisting in humidifying air substantially to saturation and regulating the temperature at which the air is saturated to give the air a definite dew point, discharging said humidified air into a room containing the material in a direction and at a velocity to induce a circulation of the other air in the room, heating the incoming humidified air before it mixes with the other air in the room, and regulating under the control of the relative humidity of the atmosphere in the room the temperature to which the incoming humidified air is heated to maintain a definite relative humidity in the room.

2. The herein described method of drying hygroscopic materials, consisting in circulating air through a room containing the material, saturating the circulating air with moisture by a water spray and regulating the temperature of saturation by controlling the temperature of the spray water and the addition of fresh air to said circulating air to give the saturated air a definite dew point before it enters the room, heating said saturated air before it mixes with the other air in the room, and regulating under the control of the relative humidity of the atmosphere in the room the temperature to which the incoming air is heated, thereby raising the temperature of the saturated air to give the desired relative humidity in the room and introducing fresh heat in the room to take care of the radiation of latent heat by evaporation of moisture in the room.

3. The herein described method of drying hygroscopic materials, consisting in humidifying air substantially to saturation and regulating the temperature at which the air is saturated to give the air a definite dew point, discharging said humidified air into a plurality of rooms containing the material, and independently controlling the relative humidity in the several rooms by independently heating the humidified air supplied to each room under the control of the relative humidity of the atmosphere in that room.

4. The herein described method of drying hygroscopic materials, consisting in circulating air through a plurality of rooms containing the material, saturating the circulating air with moisture by a water spray and regulating the temperature of saturation to give the saturated air a definite dewpoint before it enters the rooms, independently heating the air delivered to each room before it mixes with the other air in said room, and independently regulating under the control of the relative humidity of the atmosphere in each room the temperature to which the air delivered to that room is heated, thereby raising the temperature of the humidified air to give the desired relative humidity in each room and introducing fresh heat in the room to take care of the radiation of latent heat by evaporation of moisture in the room.

5. In an apparatus for drying hygroscopic materials, the combination of a room containing the material, means for humidifying air substantially to saturation, means for regulating the temperature at which the air is saturated to give the air a definite dew point, means for discharging the humidified air into the room in a direction and at a velocity to induce a circulation of the other air in the room, means for heating the incoming humidified air before it mixes with the other air in the room, and a hygrostat which responds to changes in humidity in the room and controls said heating means for raising the temperature of said humidified air to give a definite relative humidity in the room.

6. In an apparatus for drying hygroscopic materials, the combination of a room containing the material, means for circulating air through said room, means for spraying water into said air to saturate the air with moisture, automatic means for varying the temperature of the spray water and adding fresh air to said circulating air to give the circulating air a definite dew point before it enters the room, a heater for raising the temperature of said saturated air before it mixes with the other air in the room, and a hygrostat which responds to changes in humidity in the room and controls said heater for regulating the temperature to which the incoming air is raised, thereby raising the temperature of the saturated air to give the desired relative humidity in the room and introducing fresh heat in the room to take care of radiation of latent heat by evaporation of moisture in the room.

7. In an apparatus for drying hygroscopic materials, the combination of a plurality of rooms containing the material means for humidifying air substantially to saturation, means for regulating the temperature at which the air is saturated to give the air a definite dew point, means for supplying said humidified air to the several rooms, means for independently heating the humidified air supplied to each room, a separate hygrostat for each of said rooms which responds to changes in humidity in said room and controls the air heating means to regulate the temperature to which the air supplied to that room is raised and maintain a substantially constant relative humidity in the room.

8. In an apparatus for drying hygroscopic materials, the combination of a plurality of rooms containing the material, means for circulating air through said rooms, means for spraying water into said air to saturate the air with moisture, automatic means for varying the temperature of the spray water and adding fresh air to said circulating air to give the circulating air a definite dew point before it enters the rooms, a separate heater for raising the temperature of the saturated air supplied to each room before it mixes with the air in the room, a separate hygrostat for each room which responds to changes in humidity in said room and controls the heater for said room to regulate the temperature to which the air delivered to that room is raised and maintain a substantially constant relative humidity in the room.

Witness my hand this 20th day of May, 1918.

WILLIS H. CARRIER.

Witnesses:
J. I. LYLE,
H. WORSHAM.